United States Patent [19]

Huang et al.

[11] Patent Number: 5,571,555

[45] Date of Patent: Nov. 5, 1996

[54] STABLE ICING COMPOSITION

[75] Inventors: Victor T. Huang, Moundsview; Lorri D. Cullen, Minneapolis; James A. Kivi, Brooklyn Center, all of Minn.

[73] Assignee: The Pillsbury Company, Minneapolis, Minn.

[21] Appl. No.: 409,328

[22] Filed: Mar. 23, 1995

[51] Int. Cl.$^6$ .............................. A23G 3/00; A23L 1/09
[52] U.S. Cl. ........................ 426/659; 426/327; 426/321
[58] Field of Search ................... 426/565, 573, 426/658-9, 567, 566, 321, 327

[56] References Cited

U.S. PATENT DOCUMENTS

| | | | |
|---|---|---|---|
| 2,914,410 | 11/1959 | Butler | 426/659 |
| 3,009,812 | 11/1961 | Ganz | 426/659 |
| 3,520,698 | 7/1970 | Katz et al. | 426/572 |
| 3,526,517 | 9/1970 | Shaffer et al. | 426/572 |
| 3,532,513 | 10/1970 | Katz | 426/572 |
| 3,676,155 | 7/1972 | Horn et al. | 426/659 |
| 4,037,000 | 7/1977 | Burge et al. | 426/572 |
| 4,135,995 | 1/1979 | Cheng | 426/659 |
| 4,146,652 | 3/1979 | Kahn et al. | 426/564 |
| 4,376,791 | 3/1983 | Holbrook | 426/565 |
| 4,415,601 | 11/1983 | Eckel | 426/659 |
| 4,431,682 | 2/1984 | Smith et al. | 426/565 |
| 4,552,773 | 11/1985 | Kahn et al. | 426/564 |
| 4,717,579 | 1/1988 | Vietti et al. | 426/597 |
| 5,110,612 | 5/1992 | Quarles et al. | 426/548 |
| 5,112,626 | 5/1992 | Huang et al. | 426/43 |
| 5,175,013 | 12/1992 | Huang et al. | 426/565 |
| 5,304,389 | 4/1994 | Kondo et al. | 426/659 |

OTHER PUBLICATIONS

International Sugar Journal, 82(976), p. 113, 1980 by H. E. C. Powers entitled "Sucrose Hydrates—A Refiner's Problem".

Food Research, 1951, 16, 20–29 by Frank E. Young et al. entitled "Prevention of the Growth of Sucrose Hydrates in Sucrose Sirups".

*Primary Examiner*—Jeanette Hunter
*Attorney, Agent, or Firm*—Aleya Rahman; Janal Kalis

[57] ABSTRACT

The present invention includes a freezable material comprising sucrose and water in a concentration effective to prevent sucrose hydrate crystal formation when the material is frozen and further comprising a starch hydrolysate having a molecular weight effective for preventing weeping of the material when in contact with a water-bearing matrix.

14 Claims, No Drawings

STABLE ICING COMPOSITION

BACKGROUND OF THE INVENTION

The present invention relates to a method for preventing sucrose hydrate crystallization in a frozen material containing sucrose and preventing hygroscopic tendencies of the sucrose containing material when thawed.

Storage of foods by freezing has become so widespread that food manufacturers, processors and consumers take for granted that many types of foods can be frozen without significant damage. It has, however, long been appreciated that freezing some types of foods must be performed in a particular manner. For instance, freezing foods with a cellular matrix, such as fruits and vegetables, can damage the fruits and vegetables if the freezing and thawing steps are not performed properly. In particular, freezing disrupts cellular membranes of the fruits and vegetables.

A phenomenon that has been less widely observed is a phase change within a frozen material of substances other than water, and a precipitation of at least two types of crystals from the frozen material. One type of material that has displayed this type of crystalline formation during freezing is a material containing sucrose and water, especially when the aqueous sucrose solution is supersaturated with sucrose. This phase change is most likely to occur with materials that have high concentrations or are supersaturated with crystal-forming compounds at room temperature and subsequently frozen. Icings are an example of a material containing supersaturated crystallizable sucrose at room temperature that exhibits this phase change phenomenon during frozen storage.

An aqueous sucrose solution, considered singularly, precipitates crystals that have been identified as sucrose hydrate crystals, anhydrous sucrose crystals and ice. In particular, two hydrates of sucrose have been observed, hemiheptahydrate $C_{12}H_{22}O_{11} \cdot 3\frac{1}{2} H_2O$ and hemipentahydrate, $C_{12}H_{22}O_{11} \cdot 2\frac{1}{2} H_2O$.

The sucrose hydrate crystals appear as "blooms" on the surface of the frozen sucrose-containing material. Susceptible materials include foods such as icings and fruits that contain sucrose and water. The blooms detract from the appearance of a frozen iced product such as a cake. In particular, the sucrose hydrate blooms impart a "moldy" or otherwise unacceptable appearance to the surface of the frozen material.

Once the frozen material with sucrose hydrate crystal blooms is warmed to room temperature, the sucrose hydrate crystals resolubilize into the material and cause the blooms to disappear. Once thawed, however, the material such as an icing, absorbs additional moisture from the air and from any matrix in contact with the material. "Flat" icings are particularly susceptible to this absorption. A "flat" icing is an icing that is not substantially whipped or aerated. A "flat" icing sets to hardness.

The absorption of moisture is due to a hygroscopic property of low molecular weight amorphous components in the icing. The absorption of moisture causes the material to become more fluid and to manifest a condition known as "weeping," in which the additional water absorbed by the material causes the material to become more fluid. Weeping causes the development of a wet interface between the material, such as icing, and any underlying matrix, such as cake, as water migrates from the matrix to the material.

The wet interface causes the material to become slippery and to slip off the matrix. In the case of an icing material on a cake matrix, weeping renders the icing susceptible to slipping off of the cake.

Additionally, over time, in a saturated or supersaturated material at room temperature, the additional moisture absorbed causes the excess crystalline component to solubilize completely forming a clear fluid. When the material is on the surface of a matrix, the matrix tends to absorb the fluid material, causing the material to partially or completely disappear from the surface and causing the matrix to become soggy and otherwise unacceptable. For example, when the material is icing and the matrix is cake, the icing becomes clear and patchy on the surface of the cake and the cake underlying the icing is soggy and unappealing.

The Horn et al., U.S. Pat. No. 3,676,155, issued Jul. 11, 1972, describes an icing that includes sucrose, and a levulose-dextrose mixture. This icing forms a skin that is not sticky. The skin permits an iced product to be packaged very soon after the skin is formed. The patent describes the relative amounts of sucrose and dextrose in its formulation as "critical".

The Burge et al., U.S. Pat. No. 4,037,000 issued Jul. 19, 1977, describes an icing that includes xanthan gum. This icing includes a free water content that "must not exceed 10.5% by weight."

The Cheng U.S. Pat. No. 4,135,005 issued Jan. 16, 1979, describes a freeze-thaw and heat stable icing. The icing includes a high melting point fat and a gelling system of xanthan gum and locust bean gum.

The Eckel U.S. Pat. No. 4,415,601 issued Nov. 15, 1983, describes an icing that includes powdered whey, powdered corn starch and a high melting point fat. The icing is described as a "quick hardening icing".

The Katz U.S. Pat. No. 3,532,513, issued Oct. 6, 1970, describes an aerated icing that includes a particular corn syrup preparation. The corn syrup preparation has a disaccharide to monosaccharide ratio of at least 3:1. The icing also includes a water concentration of 7 to 17 percent by weight and an emulsifier concentration of 1 to 20 percent by weight.

An article entitled "Prevention of the Growth of Sucrose Hydrates in Sucrose Syrups" by Young et al in *Food Research*, on pages 20–29 (1951) describes various aspects of sucrose hydrates. The reference describes a maximum rate of hydrate formation as occurring at about minus 23.3° C. The reference also describes a use of an additive in a sucrose containing material. The additive includes ingredients such as maltose, dextrin and low conversion corn syrup. The reference further described the rate of sucrose hydrate growth as being greatest in solutions containing 55% sucrose.

SUMMARY OF THE INVENTION

The present invention includes a freezable material that comprises water and sucrose in concentrations effective for preventing hydrated sucrose crystal formation when the material is frozen and that further comprises a starch hydrolysate having a molecular weight effective for preventing weeping of the material when in contact with a water-bearing matrix.

The present invention also includes a method for preventing a formation of sucrose hydrate crystals in a freezable material that includes sucrose and water while also preventing weeping of the material when in contact with a water-bearing matrix. The method includes adjusting the concentration of sucrose to a range that is not greater than about 40 percent by weight and adjusting the concentration of water within a range of about 15 to 25 percent by weight of the material. The method also includes adding a starch hydrolysate in a concentration in a weight range of about 10 to 50 percent by weight. The starch hydrolysate has an average molecular weight range of about 250 to 1800 grams per mole.

DETAILED DESCRIPTION OF PREFERRED EMBODIMENTS

The present invention includes a freezable material that comprises sucrose and water ingredients in concentrations effective for preventing formation of hydrated sucrose crystals when the material is frozen and further comprises a starch hydrolysate with a molecular weight effective to prevent weeping of the material when the material is in contact with a water-bearing matrix. The sucrose ingredient has a concentration of not more than about 40 percent by weight and the water ingredient has a concentration range of about 15 to 25 percent by weight. The starch hydrolysate is present in a concentration range of about 10 to 50 percent by weight with an average molecular weight range of about 250 to 1800 grams per mole. The freezable material is free of sucrose hydrate crystals when frozen and does not weep when in contact with a water-bearing matrix.

The present invention also includes a method for preventing a formation of sucrose hydrate crystals in a freezable material containing sucrose and water. The method includes adjusting the water concentration to a range of about 15 to 25 percent by weight and adjusting the sucrose content to a concentration that is less than about 40 percent by weight. The method also includes adding a starch hydrolysate in a concentration range of about 10 to 50 percent by weight. The starch hydrolysate includes both high and low molecular weight components. Preferably, the starch hydrolysate has an average molecular weight range of about 250 to 1800 grams per mole.

It has surprisingly been found that sucrose hydrate crystal formation in the form of "blooms" can be substantially eliminated in a freezable material that includes sucrose and water by increasing the water content of the material and decreasing the sucrose content as compared to conventional concentrations in a material such as a flat icing. It has further surprisingly been found that the water activity or Aw of a composition of the present invention is substantially the same as the water activity of conventional icings having a lower water concentration range. Further, the increased water content, and presence of high molecular weight solids substantially eliminate weeping of the material, once thawed.

These findings are surprising because the present invention describes increasing water in a material containing sucrose and water in order to prevent the formation of sucrose crystals bound with water or sucrose hydrate crystals. Also surprising is the finding that the increased water does not appear to substantially affect water activity of the material, as compared to a conventional icing material. Despite the increased water content, the material is resistant to weeping when in contact with a water-bearing matrix.

It is known that a solution of sucrose and water has complex phase behavior, particularly when the solution is supersaturated and is within a temperature range of 0° C. to minus 20° C. It is also known that above a temperature of 0° C. and below a sucrose concentration of about 65 weight percent, the sucrose-water solution is in a liquid phase. Within a temperature range of 0° to minus 10° C., solutions of sucrose and water of 60% sucrose or less by weight are mixtures of ice and liquid solution. Below minus 10° C., solutions of sucrose and water are a mixture of ice and supersaturated sucrose solution, in which sucrose hydrate crystal formation may occur. At a temperature of about minus 10° C. and sucrose concentrations of about 55 to 60% by weight, sucrose hemiheptahydrate and sucrose hemipentahydrate crystals may precipitate out of solution. At higher temperatures, the anhydrous sucrose crystalline form tends to crystalize instead of the hydrated crystalline form.

The "mold-like" appearance of the hydrated sucrose bloom is actually a cluster of needle-like white hydrate crystals growing on the surface of the sucrose containing product. Once thawed, the hydrated crystals dissolve in the excess free water and disappear from the surface of the sucrose containing product.

It is believed that the increased concentration of water and decreased concentration of sucrose, as compared to conventional icings, removes the material of the present invention from the transition phase region of the sucrose-water system. What is surprising is that the increased water concentration does not substantially affect the water activity of the material and that the material is substantially free of weeping when in contact with a water-bearing matrix.

It is believed that the high molecular weight component of the starch hydrolysate in the material inhibits sucrose hydrate crystal formation by increasing the viscosity of the material, making it more difficult for sucrose molecules to diffuse through the material to form crystals. The low molecular weight component of the starch hydrolysate is believed to inhibit the formation and growth of sucrose hydrate nuclei by increasing the number of particles around which a sucrose molecule must migrate before it contacts a second sucrose molecule. A preferred starch hydrolysate in the present invention provides a balance of high and low molecular weight components so that the material does not become too viscous or sticky due to high molecular weight components and does not exhibit weeping caused by low molecular weight components.

One embodiment of the freezable material of the present invention is a flat icing. As discussed in the Background, flat icings are not substantially aerated. Flat icings are set and do not flow at room temperature. Flat icings are distinguishable from aerated icings which flow at room temperature with application of a minimal pressure.

Flat icings typically have a sucrose concentration range of about 70 to 73% by weight. The flat icing of the present invention has a sucrose concentration that is less than about 40% by weight. Preferably, the sucrose percent concentration by weight is less than about 35%. In the most preferred embodiment, the concentration of sucrose in the flat icing is less than about 30% by weight of the icing.

The flat icing of the present invention has a water content within a range of between about 15 to 25% by weight and preferably between about 16 to 22% by weight. In a more preferred embodiment, the water content is between about 19 to 21% by weight. Conventional flat icings generally have a water content less than about 14 weight percent, since higher water contents typically do not permit the icing to set at room temperature.

In one preferred embodiment, the flat icing of the present invention also includes a high maltose corn syrup in a concentration of about 30% by weight. The maltose concentration of the corn syrup is selected to be high so that the solids component of the corn syrup has a sufficiently high average molecular weight. It is believed that the high maltose corn syrup is less hygroscopic and reduces some of the weeping associated with regular low molecular weight corn syrup, which has typically been used as a sweetening agent in icings.

Preferably, the average molecular weight of the corn syrup solids ranges between about 250 and 1800 grams/mole. In one preferred embodiment, the average molecular weight range was 300 to 900 grams per mole and most preferably ranged between 340 and 600 grams per mole.

The high maltose corn syrup can be used in a range between about 10 to 50% by weight of the icing, based on a syrup having about 20% moisture by weight. A preferred concentration range is about 15 to 45% by weight. A more preferred concentration range is about 20 to 40% by weight and the most preferred range is about 25 to 35% by weight.

In a preferred embodiment, the high maltose corn syrup has a ratio of carbohydrates with a degree of polymerization (DP) of 1, i.e. monosaccharides, to carbohydrates with a DP2, i.e. disaccharides, which is less than about 1; that is, DP1/DP2 is less than about 1. In another preferred embodiment, the high maltose corn syrup fraction having a degree of polymerization of 4 or greater (DP4+), i.e. tetramers and higher polymers, is present in a concentration of less than about 50%, preferably less than about 45% and more preferably less than about 40% of the corn syrup by weight. In another preferred embodiment, the high maltose corn syrup preferably contains disaccharides (DP2) at a concentration of at least about 25% of the corn syrup by weight.

In a more preferred embodiment, the high maltose corn syrup has a monosaccharide-to-disaccharide ratio of less than about 1 and a level of tetramers and higher polysaccharides at less than about 40%. In a most preferred embodiment, the high maltose corn syrup includes a monosaccharide-to-disaccharide ratio of less than about 1, tetramers and higher polysaccharides at less than about 40%, and disaccharides at a level of at least about 25% by weight of the corn syrup.

High maltose corn syrup performance with carbohydrates in various concentrations by weight is summarized in Table I described below. The term "DE" refers to dextrose equivalence in a conventional corn syrup. The term "HM" refers to the percent maltose on a solids basis in a high maltose corn syrup.

TABLE I

| Corn Syrup | DP1(%) | DP2(%) | DP4+(%) | Performance |
| --- | --- | --- | --- | --- |
| 36 DE | 14 | 11 | 64 | Too Viscous, Sticky |
| 43 DE | 19 | 14 | 54 | Too Viscous, Sticky |
| 63 DE | 37 | 29 | 25 | Weeping |
| 34 HM | 9 | 34 | 33 | Slightly Sticky |
| 43 HM | 10 | 43 | 26 | Good |
| 65 HM | 4 | 65 | 16 | Good |
| 72 HM | 3 | 71 | 9 | Good |
| 100 DE | 100 | 0 | 0 | Weeping |

The flat icing embodiment of the present invention also includes a fat content of about 10 to 30% by weight and preferably between about 15 to 25%. Conventional flat icings have a fat concentration of less than about 10% by weight. The fats have been selected on the basis of melting points and solid fat index profiles.

About half of the added fat by weight is selected to have a high melting point so that it sets better and improves process performance of the icing during manufacture. The melting point temperature preferably ranges from between about 42° C. to about 47.5° C., and is more preferably about 44.4° C. In one preferred embodiment, the high melting point fat has a solid fat index (SFI) profile as follows:

| Temperature (°C.) | % Solid |
| --- | --- |
| 10 | 61–73 |
| 26.7 | 48–56 |
| 33.3 | 40–48 |
| 37.8 | 25–31 |
| 43.3 | 8–14 |

The remaining half of the added fat is selected to have a low melting point so that the icing has a desirable mouthfeel such as that of a high sucrose icing. In one embodiment, the low melting point shortening has a melting point temperature ranging from about 35.5° C. to 40.5° C., more preferably about 38° C. In one preferred embodiment, the low melting point fat is selected to have a solid fat index profile as follows:

| Temperature (°C.) | % Solid |
| --- | --- |
| 10 | 58–64 |
| 21.1 | 45–51 |
| 26.7 | 36–42 |
| 33.3 | 13.5–19.5 |
| 40 | 0–1.5 |

Suitable fats include butter, cocoa butter, lard, hydrogenated vegetable oils and mixtures thereof. The particular solid fat index profile used in the present invention is based upon the mouthfeel imparted, as well as the processability and setting of the icing. Not more than about 10% by weight of a high melting point shortening, having a melting point of about 60° C. or higher should be used in order to avoid a waxy mouthfeel. The shortening should not be too soft or oily at room temperature because the icing will not set when stored at room temperature.

The flat icing of the present invention preferably also includes viscosity building agents in order to build and maintain viscosity of the icing. These viscosity building agents include starch, gums and cellulose, and may include other ingredients that enhance or stabilize viscosity.

An example of a starch that can be used as a viscosity building agent in the present invention is potato starch. The potato starch, in addition to building viscosity, is also a source of high molecular weight compounds which are believed in the present invention to prevent weeping upon thawing. The potato starch is added at a concentration of about 0.5 to 4% by weight and preferably, about 1.5 to 3 % by weight of the flat icing. The potato starch is preferably a pre-gelatinized starch that has relatively short body, bland flavor, and a high water holding capacity. A material having "short body" forms a short, thick strand when separated from a preparation with a spoon.

Any pre-gelatinized starch that imparts body, bland flavor and viscosity should be acceptable. Other types of starch that are suitable for use in the present invention include modified pre-gelatinized tapioca and some corn starches.

An example of a gum that can be used in the present invention is agar. Agar is a polymer of D-galactose and 3,6-anhydro-L-galactose. Upon hydration and heating to boiling, agar forms a very strong gel. Agar stabilizes the icing emulsion by making the continuous phase more viscous and by forming a gel or film around the fat or oil phase.

In one embodiment, the agar is added in an amount less than about 1% by weight, more preferably less than about 0.5% by weight. The agar must be boiled to melt and to activate its functionality. The agar gels at between about 35° C. to 40° C. The agar must be boiled to remelt and does not work in cold processes. One suitable agar is Agar 150, available from TIC Gums, Inc. of Belcamp, Md.

The cellulose added in the present invention preferably has a very rapid hydration rate to aid in bulking up and increasing viscosity of the mixture. Cellulose also stabilizes emulsions and binds water to prevent syneresis. An example of a cellulose product that is suitable for use is Cellulose Solka-Floc™ 300FCC available from Fiber Sales and Development Corporation, St. Louis, Mo. The cellulose may be added at a concentration of about 2 to 10% by weight, preferably about 4.5 to 6.0% by weight.

In one embodiment, the icing of the present invention contains about 0–0.05% emulsifier by weight, and preferably less than 0.04% by weight. Because of the high water and fat concentration of the flat icing of the present invention, it is surprising that such a low amount of emulsifier results in a stable icing composition which does not show sucrose hydrate formation or weeping over extended periods of time. Conventional flat icings have significantly greater emulsifier concentrations, often about 1% by weight or greater.

Commercially available fats or shortenings are usually preblended with emulsifiers before they are sold. If this type of fat is used in the present invention, preferably the fat contains no more than about 0.2% emulsifier by weight of fat.

The flat icing of the present invention may include additional ingredients in order to provide desirable organoleptic qualities associated with icings. These additional ingredients include flavoring agents and coloring agents. The flavoring agents may be natural or artificial and include buttercream, chocolate, fruit, vanilla, and nuts such as almond, peanut butter, hazelnut and pistachio. The coloring agents include natural or artificial food grade colorants such as caramel coloring, titanium dioxide, and the like. These additional ingredients can be added in any amount that results in the desired organoleptic qualities, but preferably in amounts ranging from about 0.1% to 5% by weight of the material.

It is believed that although an icing of the present invention has a relatively high water concentration, the combination of high molecular weight compounds and high fat concentration are capable of preventing the extra water from forming sucrose hydrates when frozen, from weeping at room temperatures, while "setting" at room temperatures or greater. These features permit the icing of the present invention to be applied and set at a higher than ambient temperature, for example, immediately after baking a cake, and then to be frozen for storage and subsequent use without the formation of blooms or the development of weeping when the iced cake is thawed prior to use.

The flat icing of the present invention is preferably prepared as described. In one embodiment, a high maltose corn syrup is heated to a temperature of about 57.2 to 65.6° C., and is preferably heated to about 58.3 to 64.4° C. A slurry of agar and water is prepared by heating to boiling and then held at about 65.5° C. In one embodiment, the slurry has an agar concentration of about 1.3% by weight and a water concentration of about 3% by weight. The concentration of agar slurry added is adjusted in relation to the level of water in the formula. The shortening is separately melted and held at a temperature of about 54.4° C. The potato starch is added to the high maltose corn syrup and is heated and mixed to form a homogeneous mixture. The agar slurry is then added to the mixture. The melted shortening is next added to the mixture. Sucrose and additional minor ingredients are added and mixed until all ingredients are combined.

In one embodiment, the viscosity of the final composition is between about 50 and 150,000 centipoise at about 49° C. as measured in a Brookfield viscometer with a No. 28 spindle at 0.5 rpm. In a more preferred embodiment, the viscosity ranges from between about 50,000 to 100,000 centipoise, measured as described above.

The icing is preferably applied to a matrix such as cake having temperature high enough so that the icing does not set too rapidly and low enough so that the icing does not melt on the matrix. Preferably, the icing is applied at a temperature of at least about 40° C. A preferred range is about 40°–60° C. A more preferred range is about 46° C. to 54° C. The most preferred temperature application in this embodiment is between about 46° C. to 51° C. Other acceptable matrices include cookies, sweet rolls and pastries. The composition described herein can also be used as a filling or glaze for products such as doughnuts, sandwich cookies, and the like.

When the icing of the present invention is applied to a material such as a cake and frozen at a temperature of about −4.4° C. or less, the icing does not display any substantial sucrose hydrate bloom development. The typical freezing temperature is about −17° C. The preferred freezing temperature is about −23° C. and below. The icing may be frozen for extended periods of time without substantial bloom development. Further, when the icing and cake are thawed, the icing does not weep. The integrity of the icing, once thawed, remains intact. The icing does not fluidize and absorb into the underlying cake. The icing displays acceptable texture, mouthfeel, sweetness and appearance and is easier to process and handle due to its reduced stickiness.

Although the present invention has been described with reference to preferred embodiments, workers skilled in the art will recognize that changes may be made in form and detail without departing from the spirit and scope of the invention.

What is claimed is:

1. A freezable flat icing, glaze or filling that is substantially free of aeration comprising sucrose and water in concentrations effective to prevent sucrose hydrate crystal formation when the flat icing, glaze or filling is frozen and further comprising a starch hydrolysate having a molecular weight effective to prevent weeping of the flat icing, glaze or filling when the flat icing, glaze or filling is in contact with a water-bearing matrix.

2. The flat icing, glaze or filling of claim 1 wherein the sucrose concentration is less than about 40% of the material by weight.

3. The flat icing, glaze or filling of claim 1 wherein the water concentration is within a range of about 15% to 25% by weight of the material.

4. The flat icing, glaze or filling of claim 1 wherein the starch hydrolysate concentration is within a range of about 10% to 50% by weight.

5. The flat icing, glaze or filling of claim 4 wherein the starch hydrolysate has an average molecular weight within a range of about 250 to 1800 grams per mole.

6. The flat icing, glaze or filling of claim 1 wherein the starch hydrolysate comprises a corn syrup with a monosaccharide-to-disaccharide ratio of less than about 1.

7. The flat icing, glaze or filling of claim 1 and further including an emulsifier concentration of less than about 0.05% by weight of the material.

8. A method for eliminating sucrose hydrate crystal formation in a material that includes sucrose and water, comprising:

heating a starch hydrolysate having a concentration within a range of about 10 to 50 percent by weight wherein the hydrolysate has an average molecular weight within a range of about 250 to 1800 grams per mole; and adding a mixture that includes sucrose in a concentration of not more than about 40 percent by weight and water in a concentration within a range of about 15 to 25 percent by weight to the heated starch hydrolysate.

9. The method of claim 8 wherein a melted shortening is added to the starch hydrolysate before the sucrose mixture is added.

10. The method of claim 8 wherein the material is selected from the group consisting of an icing, a glaze and a filling.

11. The method of claim 9 wherein the shortening further includes an emulsifier.

12. The method of claim 8 and further including adding the material to a water-bearing matrix.

13. The method of claim 8 and further including freezing the material.

14. The method of claim 8 wherein the starch hydrolysate is a corn syrup having a monosaccharide-to-disaccharide ratio of less than about 1.

* * * * *